United States Patent [19]
Dennen

[11] 3,969,914
[45] July 20, 1976

[54] FLEXIBLE CORD LOCKING DEVICE
[75] Inventor: Robert S. Dennen, Littleton, Colo.
[73] Assignee: Recreational & Scientific Devices, Inc., Littleton, Colo.
[22] Filed: July 21, 1975
[21] Appl. No.: 597,525

[52] U.S. Cl. .................................. 70/234; 70/18
[51] Int. Cl.² ........................................ B62H 5/00
[58] Field of Search .............. 70/14, 15, 18, 20, 21, 70/22, 30, 49, 233, 234; 211/4, 5

[56] References Cited
UNITED STATES PATENTS

| | | | |
|---|---|---|---|
| 527,418 | 10/1894 | Free et al. .............................. | 70/15 |
| 1,359,213 | 11/1920 | Welch .................................... | 70/18 |
| 3,690,130 | 9/1972 | Eutzler ................................... | 70/18 |
| 3,774,421 | 11/1973 | Stephens, Jr. ......................... | 70/234 |

FOREIGN PATENTS OR APPLICATIONS

| | | | |
|---|---|---|---|
| 866,462 | 7/1940 | France .................................. | 70/234 |
| 107,769 | 1900 | Germany .............................. | 211/4 |

Primary Examiner—Paul R. Gilliam
Assistant Examiner—Kenneth J. Dorner
Attorney, Agent, or Firm—Phillip L. DeArment

[57] ABSTRACT

A hinged cord locking device is adapted to be clamped onto the support bar of an article to be locked such as one of the frame bars of a bicycle. The cord may be withdrawn from a spring retractable reel, wrapped around a stationary object and the locking bolt on free end of the cord locked in a locking channel in the hinged body portion of the device to thereby affix the article to the object. The hinged body portions rotatably support the two piece cable reel which is positively interlocked with the body portions to prevent removal thereof from the support bar. The locking channel is defined by the two body portions such that insertion of the locking bolt into the channel locks the cord to the body portions, the hinged body portions together and the cable reel to the body portions. When so locked, the locking device cannot be removed by opening or sliding axially off a support bar.

12 Claims, 6 Drawing Figures

3,969,914

FLEXIBLE CORD LOCKING DEVICE

BACKGROUND OF THE INVENTION

A need exists for a versatile locking device that can be used to lock objects which are susceptible of being stolen or misappropriated. One example of such objects are bicycles.

Bicycles are parked in a wide variety of locations. Consequently, to be effective, a locking device for bicycles must permit locking the bicycles to fixed objects such as poles, bicycle racks, fences, etc. Furthermore, versatility dictates that such a lock be readily and permanently attachable to bicycles of different design and in locations thereon which do not interfere with operation of the bicycle. Locking devices that are not permanently attached, are often forgotten by the operator and some are constructed in a manner which renders them susceptible to tampering.

SUMMARY OF THE INVENTION

The present invention satisfies the foregoing objects of a bicycle lock by providing a retractable cord locking device that is constructed in two parts hinged along one side. By this construction, the locking device can be clamped onto a bar even though the bar ends are inaccessible. Once assembled on a support bar, the cord can be withdrawn from the cable reel, threaded or wrapped about a fixed object and the end inserted into a locking channel in the body of the locking device. The tumblers of the locking device are moved to lock the bolt carried on the end of the cord in the channel. The bicycle is thus securely locked to the fixed object.

The action of locking the bolt in the locking channel not only prevents removal of the cord, but also interlocks the hinged body portions and the cord reel to the body portions. This arrangement frustrates attempts to disconnect the bicycle from the fixed object by disassembling the locking device.

Retractable spring means biases the cord reel to rotate in a direction which retracts the cord onto the reel. The spring means are mounted such as not to interfere with the pivoting action of the body portions.

The present invention has as one object to provide a compact, inexpensive, and lightweight cord locking device which can be readily mounted permanently onto an intermediate portion of a support bar in a manner that does not interfere with operation of the device upon which it is mounted. Additionally, it must be easily operated to lock and unlock the device to a fixed object. A further objective is to provide a locking device that is tamper-proof by disassembly, cutting, or shattering the locking device.

These and other objects will become apparent in reference to the detailed description of a preferred embodiment including the drawing thereof and in which.

DETAILED DESCRIPTION

Figure 1:
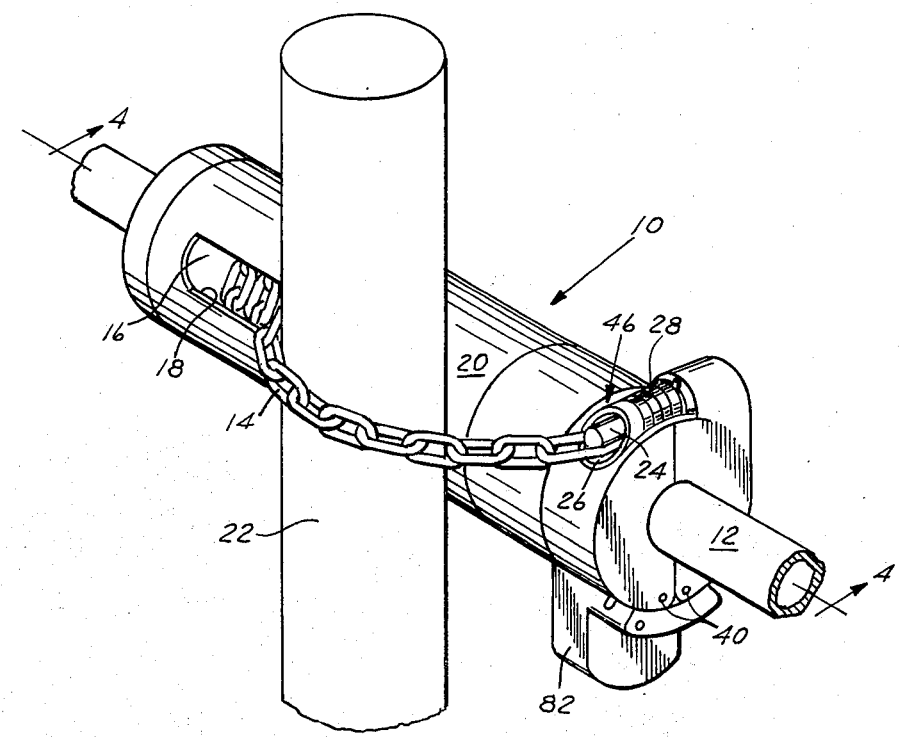
FIG. 1, is a perspective view of a cord locking device according to the present invention.

A cord locking device 10 is illustrated in FIG. 1 clamped on a support bar 12 such as one of the frame members of a bicycle. The locking device 10 comprises a retractable chain 14 that may be withdrawn from a cord reel 16 through an elongated opening 18 in a split cylindrical sleeve or cover 20.

To lock an article such as a bicycle, the cord 14, illustrated as a chain, is wrapped about a conveniently disposed fixed object, such as post 22 and locking bolt 24, secured to the free end of chain 14, is inserted into locking channel 26. The bicycle is then securely locked to the fixed post 22 and the operator may leave the bicycle without fear of its unauthorized removal.

Upon return, the operator rotates tumblers 28 until the combination is set and the locking bolt 24 can be removed from locking channel 26. The freed chain 14 is unwrapped from pole 22 and is permitted to retract onto chain reel 16. The bicycle is free to be moved.

Figure 2:
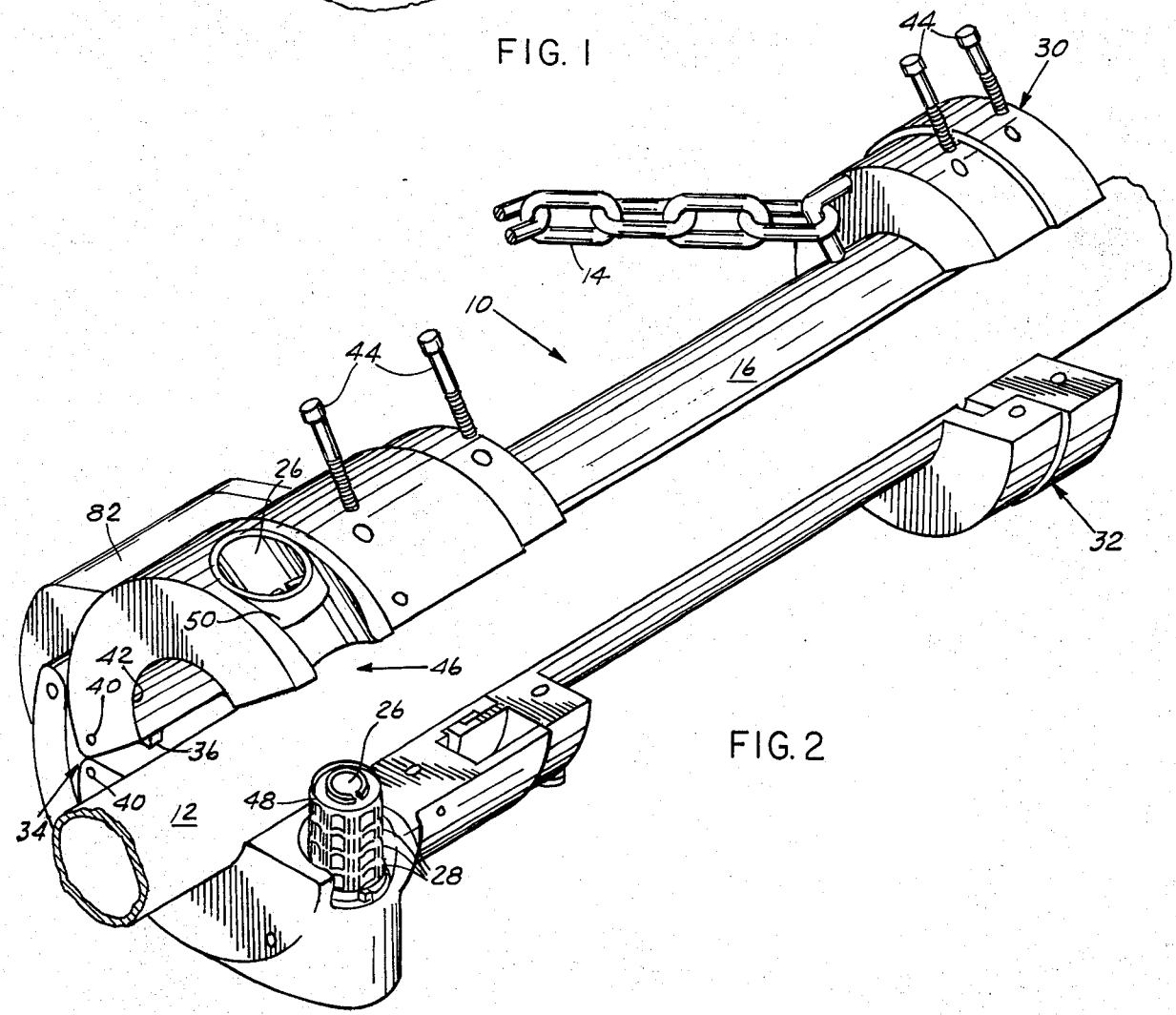
FIG. 2, is a perspective view of a cord locking device according to the present invention with the cover removed and the locking device pivoted open to receive the support bar.

An important feature of locking device 10 is the hinged construction illustrated in FIG. 2. This construction permits mounting the locking device on any bar such as one of the frame members of a bicycle where the ends thereof are inaccessible. Inaccessibility of the ends of a candidate support bar eliminates use of unitary locking devices that must be slid onto the bar over one end. Cover 20 is not shown in FIGS. 2–6, to permit illustration of details of the locking device.

The locking device 10 may be constructed from any suitable material such as metal or plastic but the material should be strong enough to resist shattering upon reasonable impact. This quality prevents a thief from shattering the lock by impacting it with a tool and removing the bicycle. Similar consideration applies to selection of cord 14. The preferred cord 14 is case hardened steel chain that is difficult to cut with standard cutting implements. However, other types of cords such as hardened steel cable may, for example, be used.

The locking device 10 comprising two similar half-cylindrical members 30, 32 which are interconnected along one side by hinge means 34. Hinge means 34 includes five hinge straps 36 (FIG. 4) received in mating slots 38 formed in members 30, 32. Pins 40 interconnect members 30, 32 and hinge straps 36 and define two laterally spaced hinge axes. This arrangement provides a hidden hinge which is less accessible and thus more tamper-proof.

Figure 4:
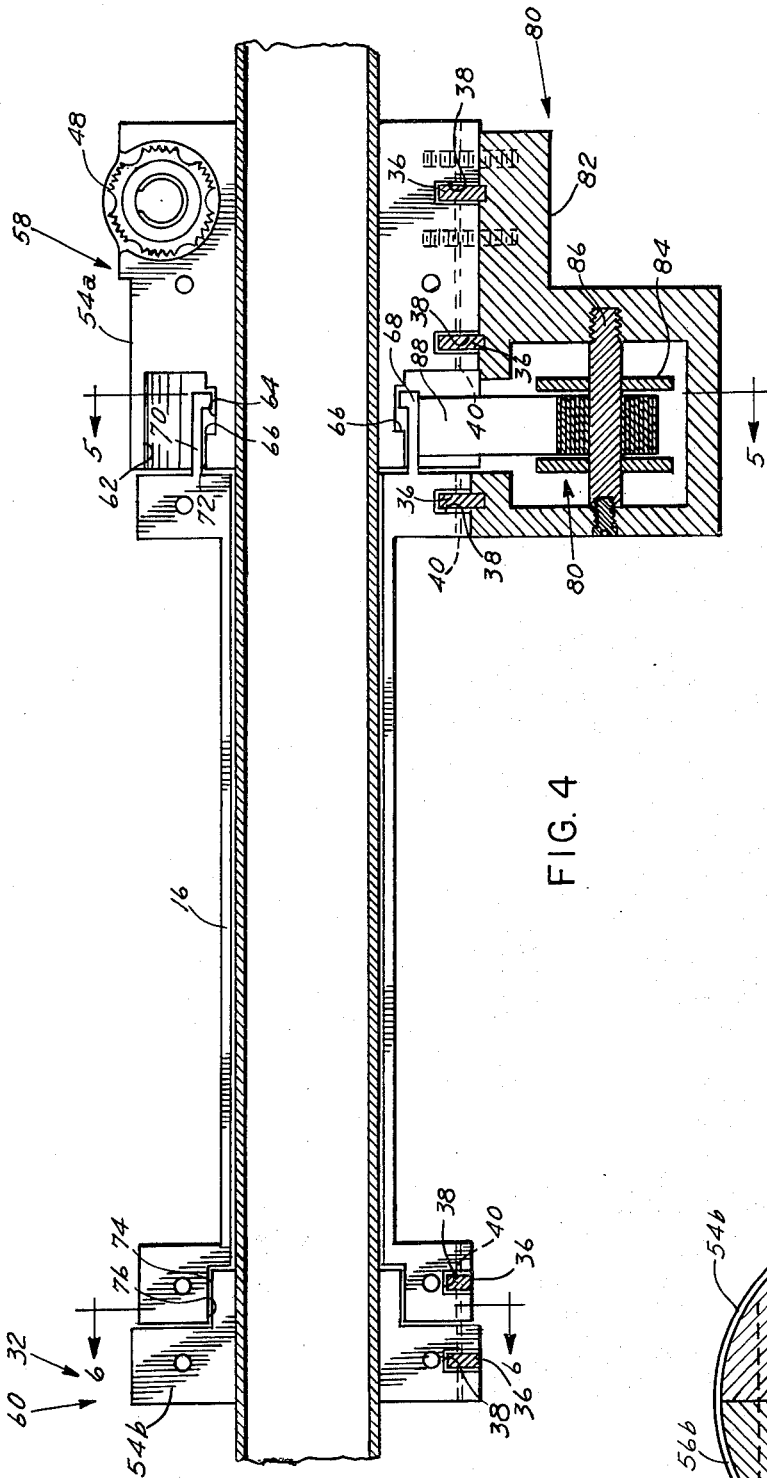
FIG. 4, is a sectional view taken approximately along line 4—4 of FIG. 1.

An opening 42 defined by members 30, 32 extends centrally throughout the length of locking device 10 for receiving the support bar 12. The diameter of opening 42 should closely approximate the diameter of bar 12 except for the diameter of reel 16. Reel 16 as best illustrated in FIG. 4 is larger than the diameter of bar 12 so that it may rotate relative to the bar 12. Due to a considerable variation in the diameters of support bars, tape shims may be used on the bar 12 to provide a snug fit with the end portions of the locking device 10. It should be apparent that this snug fit likewise prevents axial movement of the locking device relative to its support bar when the device is locked. This feature makes the hinge locking device applicable for use on bars where an end is accessible.

Figure 3:
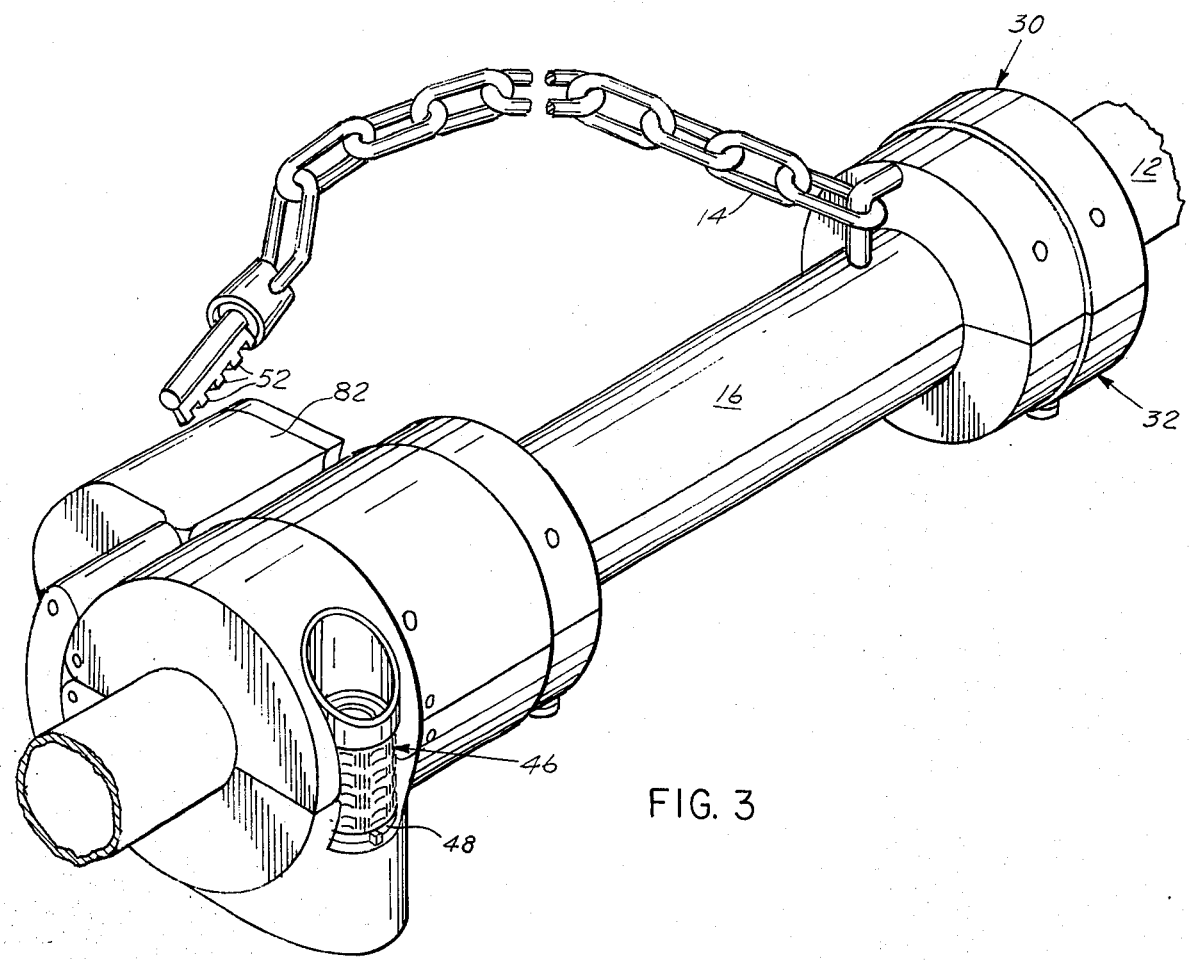
FIG. 3, is a perspective view similar to FIG. 2 showing the device closed and secured to the supporting bar.

The locking device 10 is mounted on bar 12 by pivoting members 30, 32 away from each other to open the device. It is then urged onto bar 12 as illustrated in FIG. 2 and members 30, 32 pivoted into mutual contact. Screws 44 secure members 30, 32 in their assembled position on bar 12 as illustrated in FIG. 3.

The dissimilarity in members 30, 32 is in the lock means 46. A conventional combination lock 48 is securely connected to member 32. Lock 48, when members 30, 32 are closed abuts collar 50 which is securely connected to member 30. This construction provides cooperative lock portions on members 30, 32 and the aforementioned locking channel 26. Insertion of locking bolt 24 through collar 50 and into lock 48 interlocks members 30, 32. Hence, the locking device 10 can be removed from bar 12 only by unlocking bolt 24 and removing screws 44.

Lock 48 may be of the conventional type which includes tumblers 28 which are essentially rights supported for rotation in the body of the lock and have keyways formed therein. The keyways or slots co-operate with projections 52 on locking bolt 24 and prevent removal of bolt 24 unless all keyways are aligned with the slots which is accomplished only by dialing the correct cmbination on tumblers 28.

After mounting locking device 10 on bar 12, chain 14 which is securely connected to chain reel 16 is wrapped around reel 16 and split cover 20 is snapped over reel 16 to complete the assembly. The free end of chain 14 is threaded through opening 18 in cover 20. An abutment (not shown) may be mounted on chain 14 to prevent the end from moving through slot 18 into cover 20.

Figure 5:
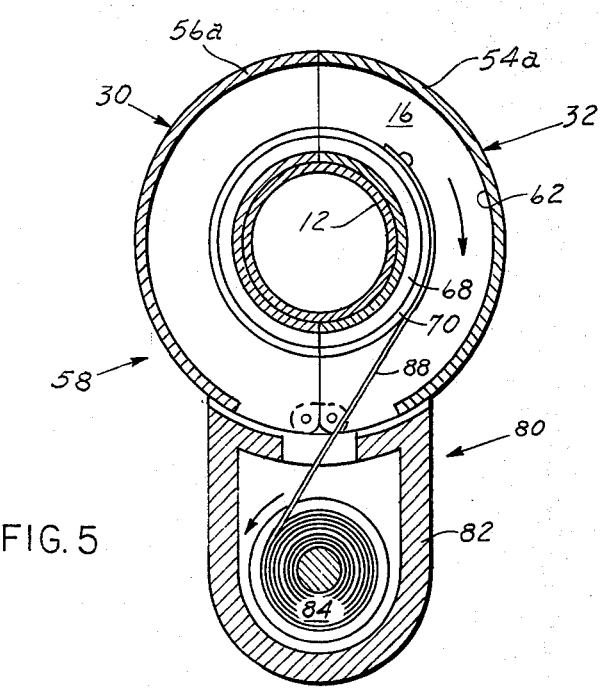
FIG. 5, is a sectional view taken approximately along line 5—5 of FIG. 4.
Figure 6:
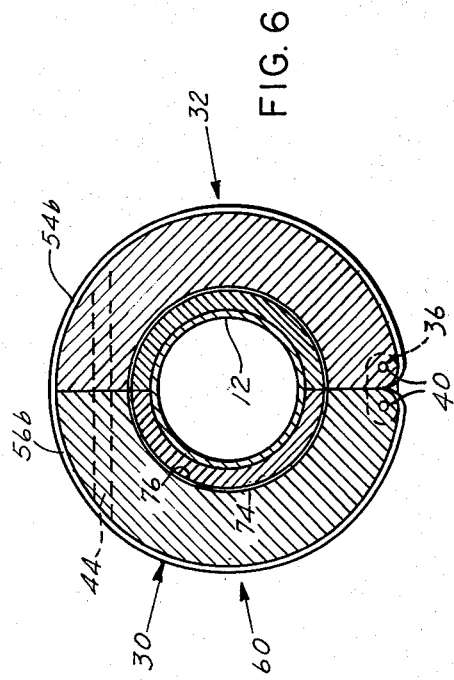
FIG. 6, is a sectional view taken approximately along line 6—6 of FIG. 4.

The manner in which chain reel 16 is mounted for rotation is illustrated in FIGS. 4-6. Although FIG. 4 shows member 32 only, it should be appreciated that member 30 is identical except for lock means 46.

First and second body portions 54a, 54b and 56a and 56b respectively, provide the support structure upon which cord reel 16 rotates. In the preferred embodiment, parts 54a and 56a co-operate to form a forward support hub 58 and parts 54b and 56b co-operate to provide an aft support hub 60.

The forward hub 58 is in the form of a cylinder with an arcuate recess 62 in the end abutting the cord reel 16 as best illustrated in FIG. 4. The inner portion of recess 62 is defined by a notched arcuate groove 64. Groove 64 is defined in part by an arcuate wall 66 which functions as an abutment face for the arcuate flange 68 supported by collar 70 extending axially from cord reel 16. The undersurface of collar 70 bears on bearing surface 72 of hub 58. The cord reel 16 thus cannot be separated axially from hub 58 due to axial interference between flange 68 and wall 66. Without such an interlocking arrangement, the locking device could be disassembled simply by removing screws 44 from hub 60 and reel 16, sliding cord reel 16 axially away from hub 58, and removing the reel from bar 12. A thief could then unwrap the cord from the fixed object and remove the bicycle.

It should be appreciated that hub 58 functions as the locking hub since the lock means 46 prevents opening of the hub unless the locking bolt 24 is removed. Without opening hub 58, the cord reel 16 cannot be separated from the hub and removed from the bar 12, or slid axially along the bar.

The other end of cord reel 16 is rotatably supported by hub 60. Hub 60 has an axially extending annular bearing surface 74 which mates with bearing surface 76 on reel 16 as illustrated in FIG. 4. Hub 60 thus holds reel 16 from axial displacement along bar 12 while providing a bearing surface therefor during rotation of reel 16 relative to bar 12. If desired, conventional solid lubricating material may be provided between bearing surfaces 74 and 76 and surfaces 70 and 72.

The locking device 10 also includes spring means 80 for biasing cord reel 16 to rotate in a direction which retracts chain 14 onto the reel. Spring means 80 comprises a housing 82 supported from hub 58. Housing 82 is supported to part 56a to pivot on pin 40. The pivotal connection permits the housing 82 to move and thus not interfere with pivoting of hub 58. The housing 82 is attached to part 54a by screws.

Housing 82 supports spring spool 84 on shaft 86. A negator spring tape 88 is secured at one end to spool 84, extends through recess 62 and is attached at the other end to ring 70 of cord reel 16 as illustrated in FIG. 5. Spring 88 exerts a constant force on reel 16 tending to rotate it in the direction of the arrow shown in FIG. 5. The spring biasing action tend to wrap or retract chain 14 onto reel 16.

It should be appreciated that the cord locking device 10 described herein has satisfied the objects set forth and although it has been described in relation to a bicycle, other applications therefor will be apparent.

Having described my invention, I claim:

1. A flexible cord locking device adapted to be clamped on a bar comprising co-operating first and second body portions having hinge means for pivotally interconnecting said body portions along one side thereof, said body portions co-operating to define throughout the length thereof a recess through which a support bar upon which the locking device is to be mounted is received, means for securing said body portions in clamped relationship including locking portions on said first and second body portions which co-operate when the body portions are brought together to define a locking channel, a cord reel having separable first and second sections supported on said body portions for rotation relative thereto, a flexible cord secured at one end to said reel and having a lock bolt connected to the free end thereof, releaseable locking means associated with said locking channel and operable to engage and lock said locking bolt when inserted into said locking channel to thereby secure the flexible cord to said body portions and prevent opening of said body portions.

2. A flexible cord locking device as defined in claim 1 further including spring means operable to bias said reel to rotate in one direction causing the cord to wrap onto the reel.

3. A flexible cord locking device as defined in claim 2, wherein said spring means comprises a negator tape spring having one end secured to a spring spool and the other end fixed to said cord reel.

4. A flexible cord locking device as defined in claim 3, wherein said spring means further includes a housing for said spring spool, means pivotally supporting said housing on said body portions to permit said housing to move out of interference with said body portion as they are pivoted to their open position.

5. A flexible cord locking device as defined in claim 1 further including means providing a rotatable interlocking connection between said cord reel and said body portion to prevent axial separation of said cord reel from said body portions.

6. A flexible cord locking device as defined in claim 5, wherein said rotatable interlocking connection comprises a circumferential collar on said cable reel mounted for rotation in a circular groove in said body portions.

7. A flexible cord locking device as defined in claim 1, wherein said body portions comprise first and second axially spaced hubs, said first hub having said locking portions and an annular groove, and said cable reel having a flange rotatably keyed in said groove to prevent said reel from being removed axially relative to said first hub.

8. A flexible cord locking device as defined in claim 7 further including a cylindrical sleeve fixedly supported on said first and second hubs, an elongated opening in a portion of said sleeve through which said flexible cord passes.

9. A flexible cord locking device, adapted to be secured to a bar comprising first and second hubs adapted to be mounted on a support bar at axially spaced locations, bearing means on said hubs, a cord reel having first and second bearing surfaces engageable with said bearing means to provide for rotation of said reel relative to said hubs, means associated with said first bearing surface and said bearing means for interlocking said reel and said first hub to prevent relative axial movement therebetween, a flexible cord secured to said reel and having a locking bolt on the free end, and means providing a locking channel on said first hub into which said locking bolt is received and secured.

10. A flexible cord locking device as defined in claim 9 further comprising spring means operatively connected to said cord reel to bias said reel for rotation in one direction.

11. A flexible cord locking device as defined in claim 10, wherein said first hub provides an arcuate recess defining said bearing means and said spring means includes a spring tape secured at one end to a spool and the other end extending through said recess and secured to said cord reel.

12. A flexible cord locking device as defined in claim 9, wherein said first and second hubs and said cord reel are each formed of two parts, hinge means interconnecting each of said parts and said means providing a locking channel includes cooperating portions on each part of said first hub such that insertion of said locking bolt therein interlocks said hinged parts of said first hub and prevents removal thereof from or by sliding along the support bar.

* * * * *